(12) United States Patent
Smutek et al.

(10) Patent No.: US 10,061,403 B2
(45) Date of Patent: Aug. 28, 2018

(54) LIGHT PEN

(71) Applicant: Mimio LLC, Cambridge, MA (US)

(72) Inventors: J. Michael Smutek, Woburn, MA (US); Luca Theo Holme, Stoneham, MA (US); Daniel Winkler, Somerville, MA (US)

(73) Assignee: Mimio, LLC, Lawrenceville, GA (US)

( * ) Notice: Subject to any disclaimer, the term of this patent is extended or adjusted under 35 U.S.C. 154(b) by 0 days.

(21) Appl. No.: 14/532,223

(22) Filed: Nov. 4, 2014

(65) Prior Publication Data

US 2016/0124527 A1    May 5, 2016

(51) Int. Cl.
*G06F 3/045* (2006.01)
*G06F 3/0354* (2013.01)
*G06F 3/038* (2013.01)
*G06F 3/042* (2006.01)

(52) U.S. Cl.
CPC ........ *G06F 3/03542* (2013.01); *G06F 3/0386* (2013.01); *G06F 3/0421* (2013.01)

(58) Field of Classification Search
CPC ............. G06F 3/03542; G06F 3/03545; G06F 3/0386; G06F 3/0421
See application file for complete search history.

(56) References Cited

U.S. PATENT DOCUMENTS

| | | | | |
|---|---|---|---|---|
| 6,529,189 B1* | 3/2003 | Colgan | ................... | G06F 3/038 178/18.01 |
| 6,742,952 B1* | 6/2004 | Chen | ....................... | B43K 5/12 138/137 |
| 8,971,568 B1* | 3/2015 | Smits | ................... | G06F 3/03545 348/169 |
| 2004/0174698 A1* | 9/2004 | Nagashima | ......... | G06F 3/03545 362/118 |
| 2004/0191485 A1* | 9/2004 | Groothues | ................ | B32B 3/10 428/166 |
| 2005/0085211 A1* | 4/2005 | Welles | ..................... | H04B 3/54 455/402 |
| 2006/0101349 A1* | 5/2006 | Lieberman | .............. | G06F 3/011 715/773 |
| 2008/0088603 A1* | 4/2008 | Eliasson | ............... | G06F 3/0312 345/176 |
| 2011/0085211 A1* | 4/2011 | King | ................. | G06F 17/30011 358/474 |
| 2014/0247249 A1* | 9/2014 | Smith | ................... | G06F 3/0418 345/175 |

* cited by examiner

*Primary Examiner* — Kent Chang
*Assistant Examiner* — Mark Edwards
(74) *Attorney, Agent, or Firm* — Sherman IP LLP; Kenneth L. Sherman; Steven Laut

(57) ABSTRACT

A light pen which works in conjunction with an image sensor array to allow the sensor array to distinguish between a finger touch and touch by the light pen. The light pen is arranged to pass through a laser curtain or other light source undetected by the image sensor.

14 Claims, 6 Drawing Sheets

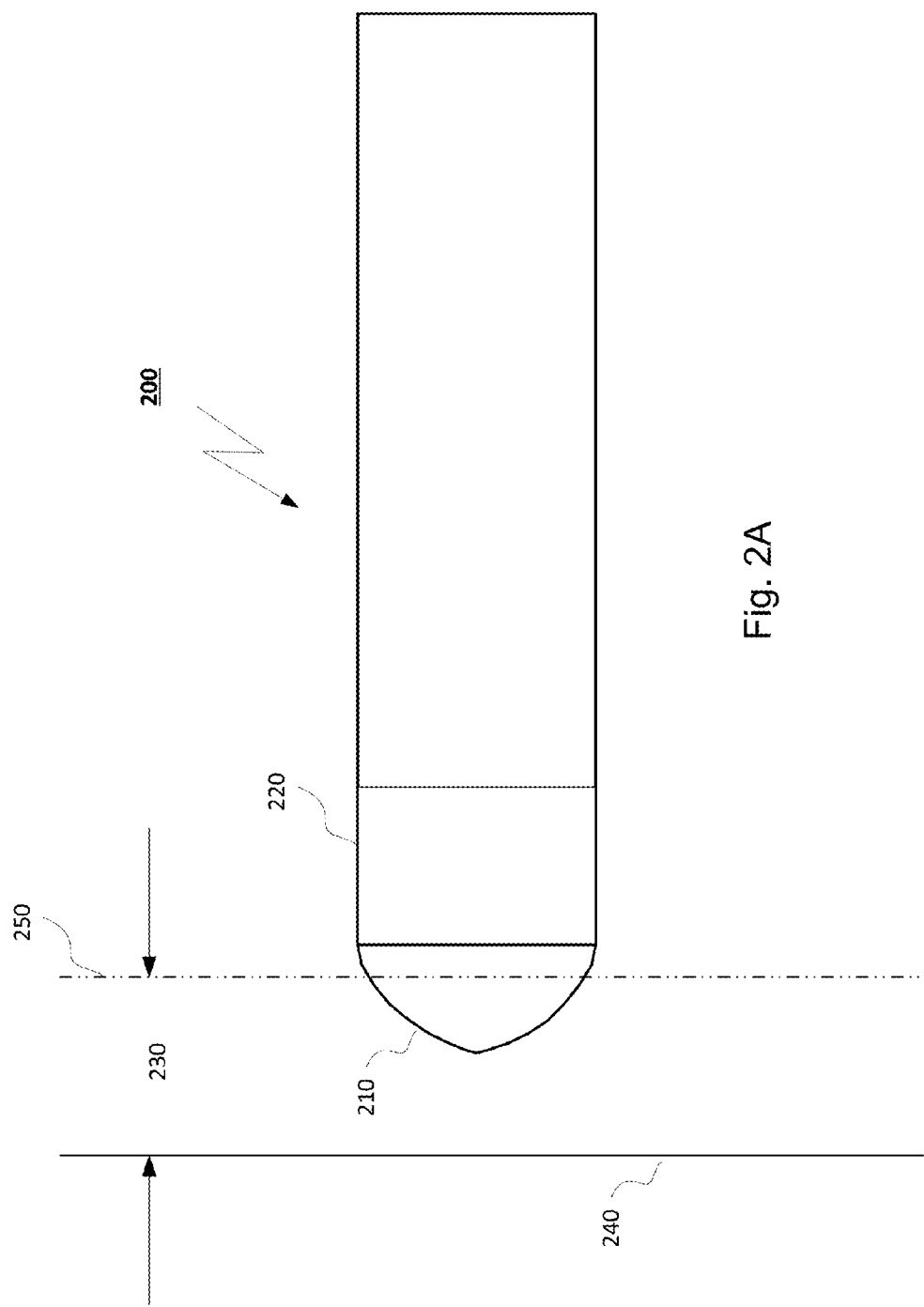

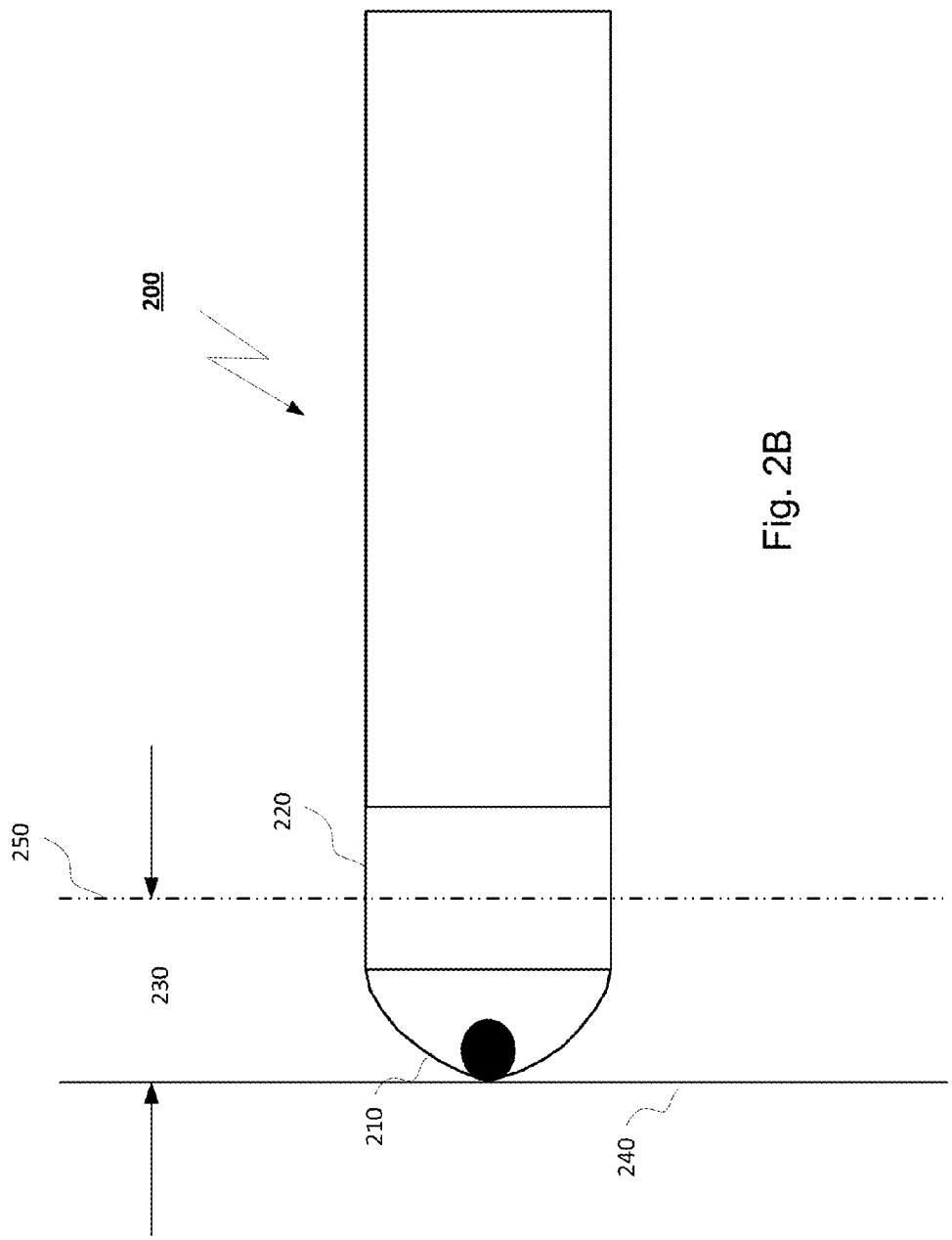

LIGHT PEN

FIELD OF THE DISCLOSURE

This disclosure relates to a light pen. In particular, the disclosure relates to an active light pen which interacts with a surface location detection system.

BACKGROUND OF THE INVENTION

Active light pens generate a light signal in the infrared (IR) portion of the electromagnetic spectrum when a nib (i.e., pen tip) arrangement is in contact with a surface.

When a plurality of IR detectors are arranged at spaced apart locations around a surface upon which a light pen is to be used (such as a wall-mounted whiteboard or a table-top collaboration space), the point at which the light signal is generated may be determined geometrically when the light signal is detected at each of the detectors. The pen tip may thus be tracked as it moves across the surface and the resulting track maybe captured and superposed on a projected image presented on the writing surface. Thus movements of the light pen (e.g., handwriting, diagrams, drawings, etc.) are translated into virtual pen marks in a projected image.

Any pointing object, such as a conventional dry-wipe, white board pen or a finger tip may be detected by a different mechanism that also uses infrared light. In one known example an array of semiconductor diode laser sources, emitting coherent beams of light in the infrared, lays down a laser "curtain.". Typically this curtain is in the near infrared range (i.e., with wavelengths between 0.7 micrometers and 1.3 micrometers ($\mu$m), which may be expressed as $0.7 \times 10^{-6}$ m to $1.3 \times 10^{-6}$ m). Again, spaced-apart IR sensors (whether the same as for detecting light pen movements or sensors dedicated to detect interruptions of the curtain) detect any deflection of the beams and interpret the overall pattern of disruption as a touch on the writing surface.

In many cases the writing surfaces are uneven and it becomes necessary to offset the laser curtain by a distance (normal to the surface) known as the "engage distance."

As a result of the offset, writing upon the writing surface may become awkward—the curtain sensors may struggle to correctly distinguish between a finger touch and a light pen.

Known solutions require communication between the pens and a projector (i.e., a device responsible for generating and displaying projected images). This communication uses light pulsing or a radio frequency (RF) signal to allow the pen to send information to the projector telling it if the pen down is activated or if the pen is just breaking the laser curtain.

SUMMARY OF THE INVENTION

According to a first aspect of present disclosure there is provided a system for determining a position on a surface, comprising:
  a light source arrangement generating at least one incident light beam;
  a pointing device comprising: a body portion; a proximal portion at an extent of the pointing device configured to be proximal to the surface; and a light emitting unit for radiating light when actuated by contact between the proximal portion and the surface; and
  a light sensor arrangement configured to sense reflected light from objects interrupting the light beam and the radiated light from the light emitting unit,
  wherein output from the light sensor arrangement is processed to determine the position of detected objects on the surface; and wherein the proximal portion of the pointing device is made of an admissive material that admits a substantial portion of the incident light from the light source arrangement, thereby avoiding detection of the pointing device until the light emitting unit is actuated.

In certain embodiments, the light source arrangement generates an IR laser curtain and the light sensor arrangement senses reflected IR light from the IR curtain. As such light is admitted and therefore not reflected by the pointing device, the pointing device remains effectively invisible to the sensor arrangement.

As a result, the pointing device (e.g., a light pen) works in conjunction with the image sensor arrangement so that its presence is sensed only when the proximal portion (e.g., a pen head) is pressed to the writing surface. Otherwise, the light pen passes through the laser curtain or other light source arrangement undetected by the light sensor arrangement: a finger or a conventional stylus would by contrast be detected by virtue of the reflection of light from the laser curtain.

Providing the light pen in combination with a touch tracking system significantly improves the subjective writing experience and substantially eliminates the deleterious effects of the presence of an engage distance. The tracking system only detects the pen when a pen surface touch is detected against the writing surface and not when it breaks the plane of the IR curtain generated by the tracking system.

According to a second aspect of present invention there is provided a pointing device for indicating a position on a surface to a surface tracking system, the surface tracking system including a light source arrangement and a light sensor arrangement, the pointing device comprising:
  a body portion;
  a proximal portion at an extent of the pointing device configured to be proximal to the surface; and
  a light emitting unit for radiating light when actuated by contact between the proximal portion and the surface;
  wherein the proximal portion is made of an admissive material that admits a substantial portion of the incident light from the light source arrangement It is an aim of certain embodiments of the present disclosure to solve, mitigate or obviate, at least partly, at least one of the problems and/or disadvantages associated with the prior art. Certain embodiments aim to provide at least one of the advantages described below.

BRIEF DESCRIPTION OF THE DRAWINGS

Various embodiments of the present disclosure will now be described with reference to the accompanying drawings, in which:

FIGS. 2A and 2B illustrate certain structural features of a pointing device in accordance with an aspect of the present disclosure when in contact with a surface and at an offset distance from the surface.

DETAILED DESCRIPTION OF PREFERRED EMBODIMENTS

The present disclosure relates to an active light pen which interacts with a surface location detection system.

In certain embodiments, the surface location detection system comprises a laser curtain touch tracking system that radiates a near-infrared light (IR) curtain over a surface (typically a board such as a whiteboard). When an object passes through the IR curtain, it will reflect a proportion of the light back to a light sensor arrangement. The output from the light sensor arrangement is processed to determine the position of detected objects on the surface. In certain arrangements, this operation is effected by a processor included in the surface location detection system: this processor may be integral to the light sensor arrangement or a distinct element of the detection system. In certain alternative arrangements, the operation is effected in a separate entity (for example in a projector used to project an image over the surface including graphical elements mapped to the detected object or a PC controlling the tracking system and/or a projector system.

Figure 1A:
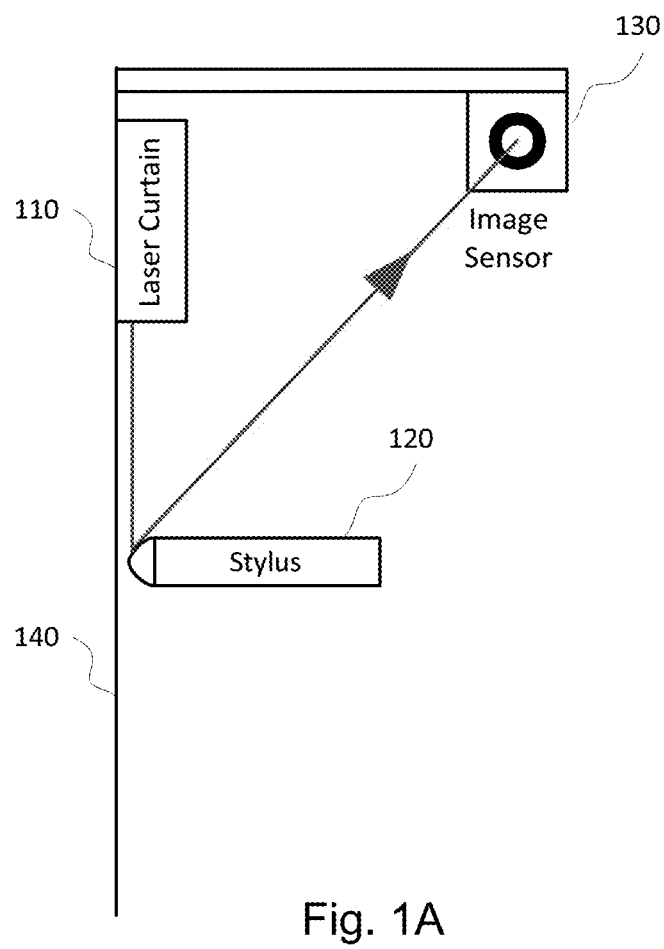
FIGS. 1A and 1B illustrate a conventional pen or stylus interrupting a laser curtain, respectively at a distance normal to, and in contact with, a writing surface.
Figure 1B:
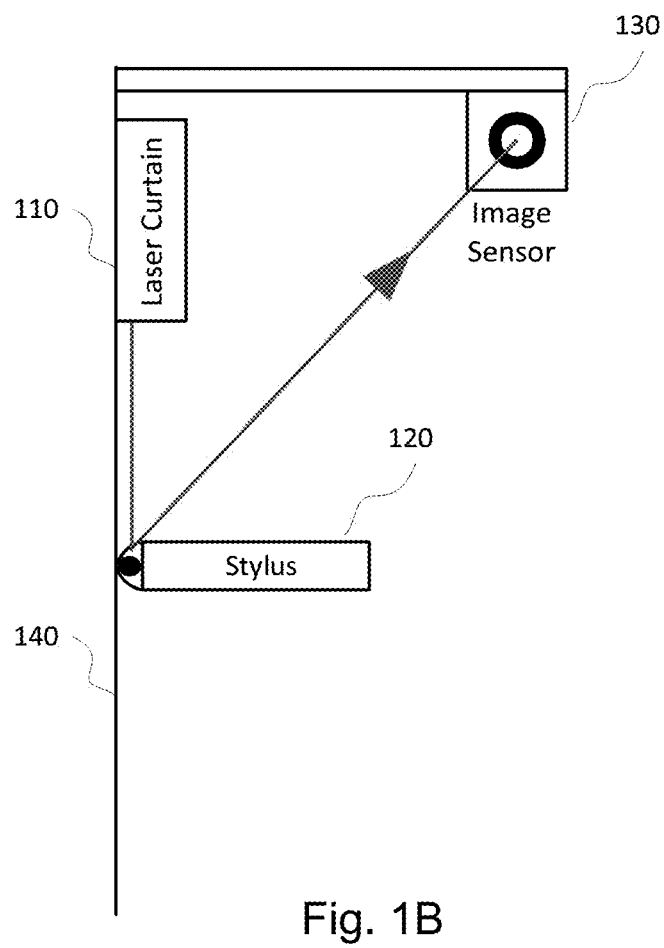

FIGS. 1A and 1B illustrate a conventional pen or stylus 120 interacting with such a surface location detection system. In this case, the surface location detection system uses a laser curtain generated by a source 110. Light reflected from the stylus 120 is detected by an image sensor 130 of the surface location detection system.

In FIG. 1A, the stylus is offset at a distance normal to a writing surface 140 yet still interrupting the laser curtain.

In FIG. 1B, the stylus is in contact with the writing surface 140, yet again interrupting the laser curtain.

In both cases, the image sensor detects an IR signature caused by the interrupting stylus 120.

FIGS. 2A and 2B illustrate certain structural features of a pointing device 200 in accordance with an aspect of the present disclosure at an offset distance from a surface 240 and when in contact with the surface.

A common problem with laser curtain systems is that the IR curtain needs to be offset from the board surface to allow for surface irregularities. The distance between the board surface and the IR curtain is referred to as the "engage distance." The presence of an engage distance can however lead to writing quality issues. The natural movements of the pen lifting the pen tip and then depressing once more may not be detected as the pen may not be lifted sufficiently above the engage distance for this movement to be correctly interpreted. The writer is therefore forced to exaggerate certain writing actions to achieve a desired output—this can detract from the effective use of the tracking system.

In FIG. 2A, a laser curtain 250 is offset from the surface 240 by an engage distance 230. The pointing device 200 is offset at a distance normal to a surface 240: as this distance is less than the engage distance 230 the pointing device 200 still interrupts the laser curtain.

In FIG. 2B, the pointing device 200 is in contact with the surface 240 yet again interrupting the laser curtain.

The proximal portion of the pointing device 200 interrupts the laser curtain in both cases. The proximal portion is shown to comprise both a pen tip section 210 and a proximal housing section 220. The pointing device 200 in FIG. 2B extends through the laser curtain 250 where the proximal housing section 220 extends from the tip in contact with the surface 240 to a distance normal to the surface exceeding the engage distance.

In certain embodiments, the light pen is constructed so that the tracking system "sees" (i.e., detects reflected IR radiation from) the pen when a pen surface touch is detected on (or at) the surface and not when the pen breaks the plane of the IR curtain.

When a light pen breaks the IR curtain, IR light having a characteristic signature is reflected back to the system, the IR signature resembling that of a finger activating the curtain. Certain embodiments allow the tracking system to distinguish the IR signatures of a conventional pointing object (such as a finger or a conventional whiteboard marker) from the light pen by providing a mechanism where the tracking system may ignore the light pen while it was approaching the surface (but not yet touching it).

Certain embodiments of the present disclosure add a near-infrared absorbent material to the pen, which allows it to reflect minimal amounts of IR (which in turn leaves the pen practically undetectable to the tracking system until a pen surface touch event is registered). The light absorbing pen will pass through the IR curtain undetected and will radiate IR onto the surface (and the IR sensors) only when a pen surface touch event is detected, allowing it to be tracked by the system.

A light pen in accordance with certain embodiments is constructed of a material that does not allow the near-infrared to be reflected back to the image sensor. In certain embodiments, the light pen is alternatively constructed of a material that allows light (or at least the IR portion) to pass through or be redirected (i.e., an IR-transparent or IR-translucent material).

Figure 3A:
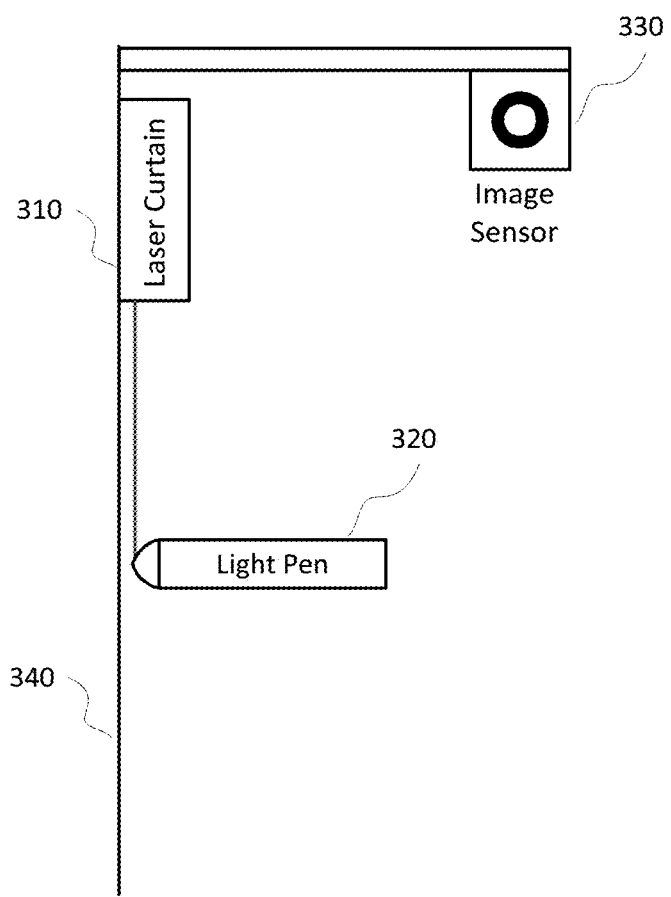
FIGS. 3A and 3B illustrate a pointing device in accordance with an aspect of the present disclosure when a light emitting unit is either inactive or actuated by contact with a surface.
Figure 3B:
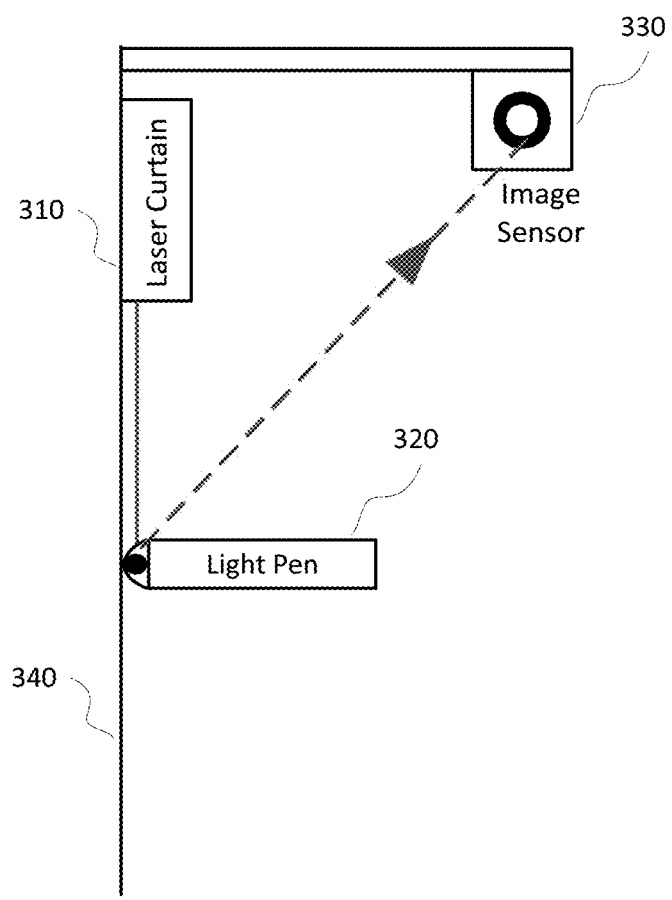

FIGS. 3A and 3B illustrate a pointing device 320 in accordance with an aspect of the present disclosure when a light emitting unit at the portion of the pointing device 320 proximal to a surface 340 is either inactive or actuated by contact with the surface.

As for FIGS. 1A and 1B, FIGS. 3A and 3B illustrate a surface location detection system that includes a laser curtain generated by a source 310 to track the pointing device 320. Light reflected from the pointing device 320 is detected by an image sensor 330 of the surface location detection system.

In FIG. 3A, the pointing device 320 (i.e., an active light pen) is offset at a distance normal to the surface 340 yet still interrupting the laser curtain. As the pointing device 320 has at least a proximal portion constructed of a material that admits light (here shown as fully absorbed), the interruption of the laser curtain does not result in an IR signature that can be detected by the image sensor 330.

In FIG. 3B, the stylus is in contact with the writing surface 140, yet again interrupting the laser curtain. Here, the light emitting unit of the pointing device 320 is actuated by contact with the surface 340 and the image sensor 330 detects the IR signature caused by the activated light emitting unit.

In certain embodiments the entire front of the pen is designed to absorb (or pass) as much near-infrared light as possible. The two major parts that make up the front of the light absorbent pen is the front housing and the tip (for example, the proximal housing section 220 and the pen tip section 210 respectively of FIGS. 2A and 2B).

In certain embodiments, the front housing is made of a near-infrared absorbent material such as, but not limited to, EPDM (ethylene propylene diene terpolymer), vinyl, plastic dyes, films, or paint that covers the majority of the surface area that will come in contact with the plane of the IR curtain. In certain embodiments, the front housing material is also wrapped around to the very front of the pen to limit IR reflection when the pen is not at a perpendicular angle from the white board.

Typically, the IR-absorbent material is too soft to be used as a practical pen tip (which may be subject to considerable impact). To provide a more satisfactory pen tip, the pen tip is manufactured, in certain embodiments, in a more robust material that would nevertheless allow the IR to pass through as much as possible minimizing the amount of IR reflected back to the image sensor. The use of such IR-transparent material provides a degree of design freedom for the pen manufacturer.

By ensuring that the front housing and pen tip extend to encompass substantially all of the area breaking the plane of the IR curtain, the IR signature of the light pen is significantly reduced (e.g. to power levels more than 50% lower than a conventional stylus, and typically in the range of 90% to 95% lower), preventing the image sensor tracking system from detecting the signature.

Lastly, while the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A system for determining a position on a surface, comprising:
   a light source arrangement generating at least one incident light beam;
   a pointing device comprising:
      a body portion comprising a portion including light absorbent material;
      a proximal portion at an extent of the pointing device configured to be proximal to the surface; and
      a light emitting unit for radiating light when actuated by contact between the proximal portion and the surface; and
   a light sensor arrangement configured to sense reflected light from objects interrupting the at least one incidental light beam and the radiated light from the light emitting unit, wherein an output from the light sensor arrangement is processed to determine the position of detected objects on the surface, and the light absorbent material of the body portion prevents light to reflect back to the light sensor arrangement;
   wherein the proximal portion of the pointing device is made of an admissive material that admits a substantial portion of the incident light from the light source arrangement to avoid detection of the pointing device passing through the incident light from the light source arrangement without contact of the pointing device contacting the surface, and the light emitting unit is detected by the light sensor arrangement upon contact of the pointing device with the surface.

2. The system of claim 1, wherein the portion of the incident light admitted by the proximal portion of the pointing device has a cumulative power that exceeds 50 percent of the power of the incident light.

3. The system of claim 2, wherein the portion of the incident light admitted by the proximal portion of the pointing device has a cumulative power in the range from 90 percent to 95 percent of the power of the incident light.

4. The system of claim 1, further comprising:
   a projector system configured to project an image onto the surface, wherein the determined position of the detected objects is represented as a graphical element of the projected image.

5. The system of claim 1, wherein the at least one incidental light beam is a collimated beam.

6. The system of claim 1, wherein the at least one incidental light beam is a beam of coherent light.

7. The system of claim 1, wherein the at least one incidental light beam comprises light in the near infrared portion of the electromagnetic spectrum.

8. A pointing device for indicating a position on a surface to a surface tracking system, the surface tracking system including a light source arrangement and a light sensor arrangement, the pointing device comprising:
   a body portion comprising a proximate housing section including light absorbent material that prevents light to reflect back to the light sensor arrangement;
   a proximal portion at an extent of the pointing device configured to be proximal to the surface; and
   a light emitting unit for radiating light only when actuated by contact between the proximal portion and the surface;
   wherein the proximal portion is made of an admissive material that admits a substantial portion of the incident light from the light source arrangement to avoid detection by the light sensor arrangement for the pointing device passing through the incident light from the light source arrangement, and the light emitting unit is detected by the light sensor arrangement upon contact of the pointing device with the surface.

9. The pointing device of claim 8, wherein the proximal portion includes a pen tip section and the proximal housing section.

10. The pointing device of claim 9, wherein the pen tip section is configured to contact with the surface with a two-dimensional contact footprint.

11. The pointing device of claim 9, wherein the light absorbent material is manufactured of an IR-absorbent material.

12. The pointing device of claim 9, wherein the light absorbent material is manufactured of an IR-transparent material.

13. The pointing device of claim 9, wherein the pen tip section is manufactured of an IR-absorbent material.

14. The pointing device of claim 9, wherein the pen tip section is manufactured of an IR-transparent material.

* * * * *